United States Patent
Ito et al.

(10) Patent No.: US 6,940,931 B2
(45) Date of Patent: Sep. 6, 2005

(54) CLOCK-SYNCHRONISM EVALUATING APPARATUS AND METHOD

(75) Inventors: Tsugio Ito, Hamamatsu (JP); Ryuuji Wakatsuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 309 days.

(21) Appl. No.: 09/945,966

(22) Filed: Sep. 4, 2001

(65) Prior Publication Data

US 2002/0029117 A1 Mar. 7, 2002

(30) Foreign Application Priority Data

Sep. 5, 2000 (JP) ........................ 2000-269158

(51) Int. Cl.⁷ ............................................. H04L 27/06
(52) U.S. Cl. ........................ 375/344; 375/360; 375/371; 327/160; 370/516; 455/182.2; 455/192.2
(58) Field of Search ................................ 375/344, 354, 375/360, 371, 373, 375, 376; 327/141, 156, 160, 163; 370/503, 576; 455/182.1, 182.2, 183.1, 192.1, 192.2

(56) References Cited

U.S. PATENT DOCUMENTS

| | | |
|---|---|---|
| 4,821,287 A | 4/1989 | Keiper, Jr. |
| 5,410,263 A | 4/1995 | Waizman |
| 5,511,100 A * | 4/1996 | Lundberg et al. ............ 375/376 |
| 5,754,080 A * | 5/1998 | Chen et al. ................... 331/25 |
| 5,799,049 A | 8/1998 | McFarland et al. |
| 6,147,530 A * | 11/2000 | Nogawa ....................... 327/156 |
| 6,166,606 A * | 12/2000 | Tsyrganovich ............... 331/25 |

FOREIGN PATENT DOCUMENTS

| | | |
|---|---|---|
| JP | 4233349 | 8/1992 |
| JP | 10028110 | 1/1998 |
| JP | 10-143998 | 5/1998 |

* cited by examiner

Primary Examiner—Dac V. Ha
(74) Attorney, Agent, or Firm—Pillsbury Winthrop Shaw Pittman LLP

(57) ABSTRACT

Measuring gate pulse is generated that rises in synchronism with one of first and second clock signals and falls in synchronism with the other of the first and second clock signals. Then, a pulse width of the generated measuring gate pulse is measured by counting clock pulses higher in frequency than the first and second clock signals. When counted values indicative of respective pulse widths of an adjacent pair of the measuring gate pulses generated in succession coincide with each other, it is determined that the frequencies of the first and second signal are the same, but when the counted values of the adjacent pair of the measuring gate pulses do not coincide with each other, it is determined that the frequencies of the first and second signal are not the same.

15 Claims, 11 Drawing Sheets

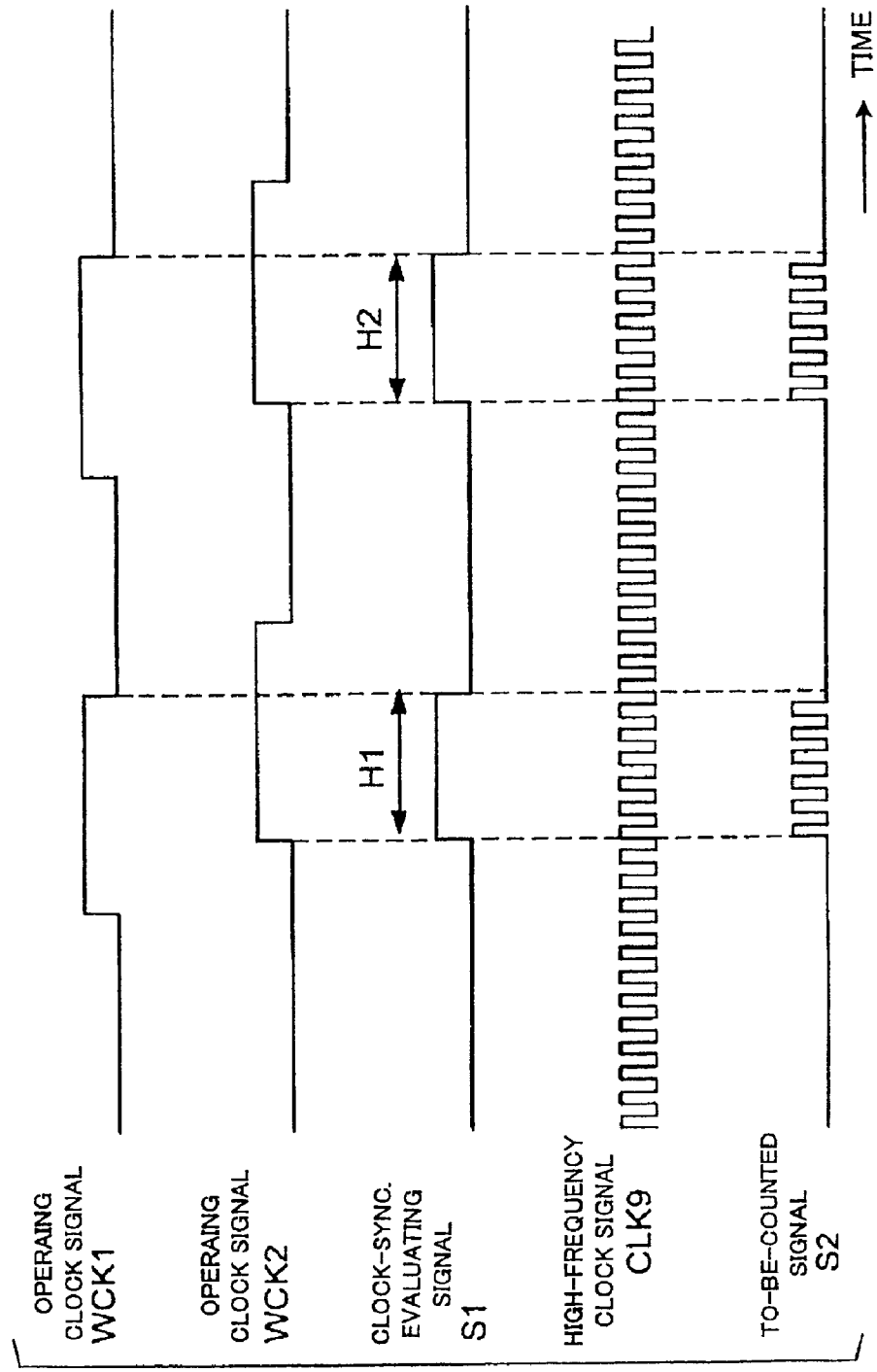

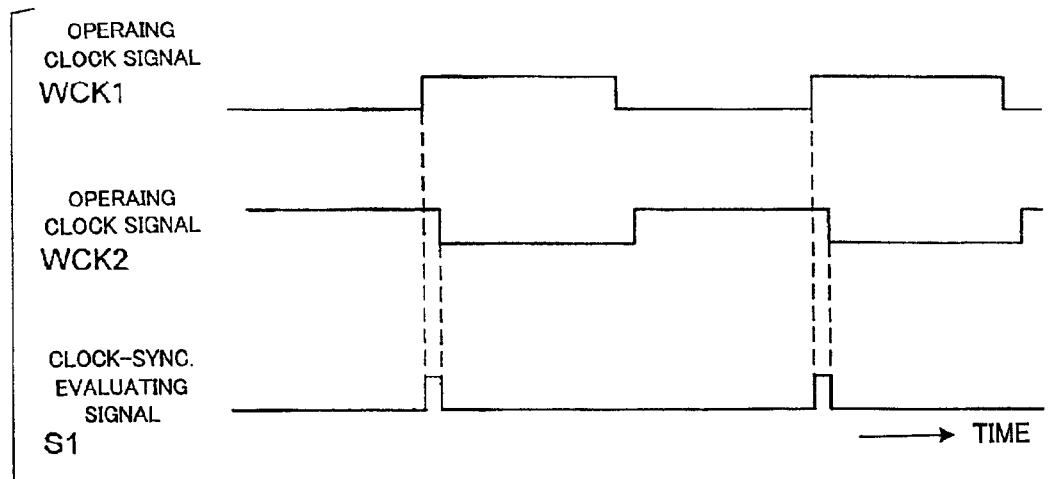
FIG. 9
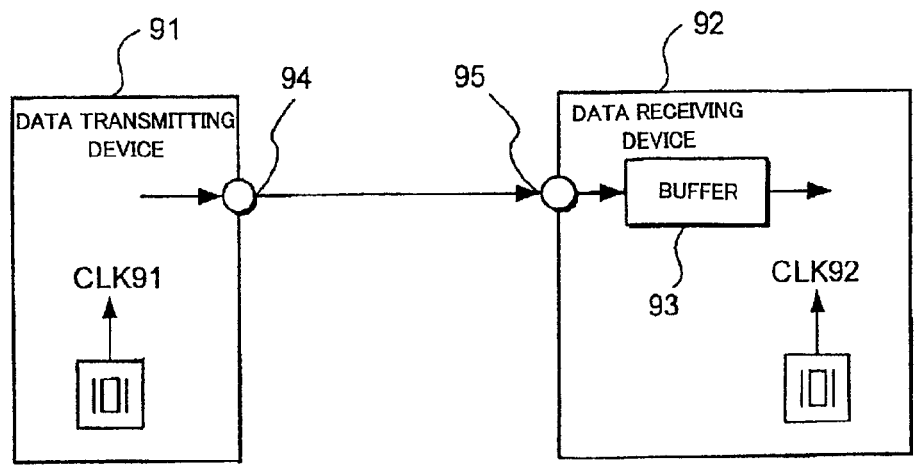
(PRIOR ART) FIG. 12

CLOCK-SYNCHRONISM EVALUATING APPARATUS AND METHOD

BACKGROUND OF THE INVENTION

The present invention relates to an improved clock-synchronism evaluating apparatus and method for evaluating synchronism between two clock signals (two clock pulse trains), i.e. determining whether or not frequencies of the two clock signals appropriately coincide with each other.

In music studios and the like, musical data are often transmitted and received between a plurality of interconnected audio devices, such as a mixer and a recorder. In such cases, it has been conventional to interconnect audio devices having operating clocks of a same frequency (e.g., 48 kHz). According to this scheme, transmission and reception rates of musical data are equal to each other, so that the data transmission and reception can be carried out in a synchronized fashion.

With the conventional method, however, operating clock pulses are generated in the interconnected audio devices independently of each other. Thus, a slight deviation or difference tends to occur between the operating clock frequencies of the individual audio devices so that the operating clock frequencies of the audio devices may undesirably get out of synchronism with each other.

Under such conditions, the musical data often can not be transmitted/received appropriately because there would occur a data dropout and noise production. Therefore, there is a need to keep monitoring as to whether or not there has occurred a frequency difference between the operating clock frequencies of the individual audio devices in order to promptly detect any frequency difference. This is because if only it can be recognized that the operating clock signals of the audio devices have got out of synchronism with each other, prompt measures, such as muting of the output signal or system-resetting of the individual audio devices, can be taken.

FIG. 12 is a diagram explanatory of a method that is being widely used today for detecting an asynchronous state between operating clocks. In this figure, a data receiving device 92 includes a buffer 93 for temporarily storing received data, and the buffer 93 has a capacity corresponding to a specific quantity of data to be transmitted or received per operating clock pulse.

In FIG. 12, data are transmitted from a data transmitting device 91 to the data receiving device 92 via interfaces 94 and 95, in synchronism with an operating clock pulse CLK91 of the data transmitting device 91. The musical data received by the data receiving device 92 are stored into the buffer 93. Then, the musical data are read out from the buffer 93 in synchronism with an operating clock pulse CLK92 of the data receiving device 92.

FIG. 13 is a time chart explanatory of operation of the buffer 93 in the data receiving device 92. In this case, data are stored into the buffer 93 in synchronism with a rising edge of the operating clock pulse CLK91 of the data transmitting device 91, and the stored data are read out from the buffer 93 in synchronism with a rising edge of the operating clock pulse CLK92 of the data receiving device 92.

The time chart of FIG. 13 concerns a case where the frequency of the operating clock pulses CLK91 of the data transmitting device 91 is slightly lower than the frequency of the operating clock pulses CLK92 of the data receiving device 92. As shown, periods (T91, T92, . . . ), each representing a time length from the time point when the data are stored into the buffer 93 to the time point when the thus-stored data are read out from the buffer 93, progressively become shorter, and thus at time point TM96, there would come the timing to perform a data read operation even though no stored data is present in the buffer 93 (empty state). In such an "empty" state, no appropriate data transmission/reception can be carried out.

Note that if, on the other hand, the frequency of the operating clock pulses CLK91 of the data transmitting device 91 is slightly higher than the frequency of the operating clock pulses CLK92 of the data receiving device 92, there would come the timing to store data into the buffer 93 even though the stored data have not yet been read out from the buffer 93 (flooded state). In such a "flooded" state too, no appropriate data transmission/reception can be carried out.

When the above-mentioned empty state or buffer flooded state of the buffer 93 is detected, it has been conventional to judge that the operating clocks have got out of synchronism with each other. Thus, it has been conventional to judge that no frequency difference has occurred between the operating clocks, as long as such a buffer empty state or buffer flooded state is detected.

With The above-discussed conventional method, it is possible to calculate a time length Tb from the time point when the operating clocks get out of synchronism with each other to the time point when the buffer is brought to the empty or flooded state, using the following equation.

$$1/Tb = FA1 - FA2$$

where "Tb" represents time (sec.) that elapses before the buffer is brought to the empty or flooded state, "FA1" represents the operating clock frequency (Hz) of one of the audio devices and "FA2" represents the operating clock frequency (Hz) of the other audio device.

Assuming that the operating clock frequency of the one audio device is 48 (48,000) kHz and the operating clock frequency of the other audio device is 48,001 Hz, the above equation calculates the time Tb as one second. In general, the smaller the frequency difference, the longer time the frequency difference detection takes, so that the conventional method can not promptly detect the frequency difference if the frequency difference is very small.

Further, in recent years, the IEEE1394 and USB (Universal Serial Bus) are often used as digital audio interfaces. These interfaces permit packet transmission/reception of about forty times as many musical data as with the conventional counterparts per operating clock pulse.

Therefore, in the case where the IEEE1394 or USB is used as an interface, the musical data receiving device must be provided with a buffer having a storage capacity about forty times greater than the conventional counterpart. Such a buffer with the increased storage takes a longer time, forty times longer than the conventional buffer, to assume the empty or flooded state, which would thus prevent a frequency difference from being detected promptly.

In general, it may be readily realized that a frequency coincidence between two clock signals can be appropriately tested by merely measuring the respective periods of the clock signals with high-speed clock pulses. However, if the periods of two clock signals having a very slight frequency difference, such as those of 48,000 Hz and 48,100 Hz, are measured in this manner, the respective periods would be detected as having no substantial difference due to a limit to the frequency or resolution of the measuring high-speed clock pulses. As a consequence, the exact frequency difference between the two clock signals could not be detected accurately.

SUMMARY OF THE INVENTION

In view of the foregoing, it is an object of the present invention to provide a clock-synchronism evaluating apparatus and method which, even when there has occurred a very slight difference in frequency between two clock signals that should essentially have same frequency, can promptly and accurately detect the occurrence of the frequency difference and hence detect that the two clock signals have gotten out of synchronism with each other.

In order to accomplish the above-mentioned object, the present invention provides a clock-synchronism evaluating apparatus which comprises: a measurement section that measures a difference between a predetermined phase point of a first clock signal and a predetermined phase point of a second clock signal; and a determination section that determines whether or not frequencies of the first signal and the second signal are the same, on the basis of a variation over time of the difference measured by the measurement section.

As an example, the predetermined phase point of the first clock signal is either one of pulse rise and fall points in the first clock signal, and the predetermined phase point of the second clock signal is either one of pulse rise and fall points in the second clock signal.

In one embodiment, the measurement section generates a measuring gate pulse that rises in synchronism with one of the first and second clock signals and falls in synchronism with other of the first and second clock signals, and the measurement section measures a pulse width of the generated measuring gate pulse by counting clock pulses higher in frequency than the first and second clock signals. Here, the determination section determines that the frequencies of the first signal and the second signal are the same when counted values indicative of respective pulse widths of an adjacent pair of the measuring gate pulses generated in succession coincide with each other, but determines that the frequencies of the first signal and the second signal are not the same when the counted values of the adjacent pair of the measuring gate pulses do not coincide with each other.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which:

FIG. 3 is a time chart explanatory of operation of various components of the clock-synchronism evaluating apparatus;

FIG. 9 is a time chart explanatory of a modification of the present invention;

FIG. 12 is a block diagram explanatory of a conventionally-known clock-synchronism evaluating method.

DETAILED DESCRIPTION OF EMBODIMENTS

First, an outline is given about principles of one embodiment of the present invention that will be described hereinafter. The embodiment is characterized in that a measurement section measures a difference between a predetermined phase point of a first clock signal WCK 1 (e.g., either one of a pulse rise point and pulse fall point of the signal WCK 1) and predetermined phase point of a second clock signal WCK 2 (e.g., either one of a pulse rise point and pulse fall point of the signal WCK 2). Then, a determination section determines whether frequencies of the first and second clock signals WCK1 and WCK2 coincide with each other, on the basis of a variation over time of the difference measured by the measurement section, such as a differential between the current measured difference and the last or other previously measured difference. If the frequencies of the first and second clock signals WCK1 and WCK2 are the same, then the difference between the pulse rise point or pulse fall point of the first signal WCK 1 and the pulse rise point or pulse fall point of the second signal WCK 2, measured by the measurement section, does not vary over time and remains constant. If, on the other hand, the frequencies of the first and second clock signals WCK1 and WCK2 are different from each other although only slightly, the difference between the pulse rise point or pulse fall point of the first signal WCK 1 and the pulse rise point or pulse fall point of the second signal WCK 2, measured by the measurement section, will vary cumulatively as the time passes. Thus, in the case where the frequencies of the first and second clock signals WCK1 and WCK2 are different from each other although only slightly, the difference between the current and previous measured differences which is too small and hence immeasurable at an initial stage, will soon present a measurable value due to the accumulation over time. Namely, the present invention has the advantage that even when the frequencies of the first and second clock signals WCK1 and WCK2 differs from each other only slightly, the present invention can promptly and accurately detect the frequency difference in a digital manner.

Figure 1:
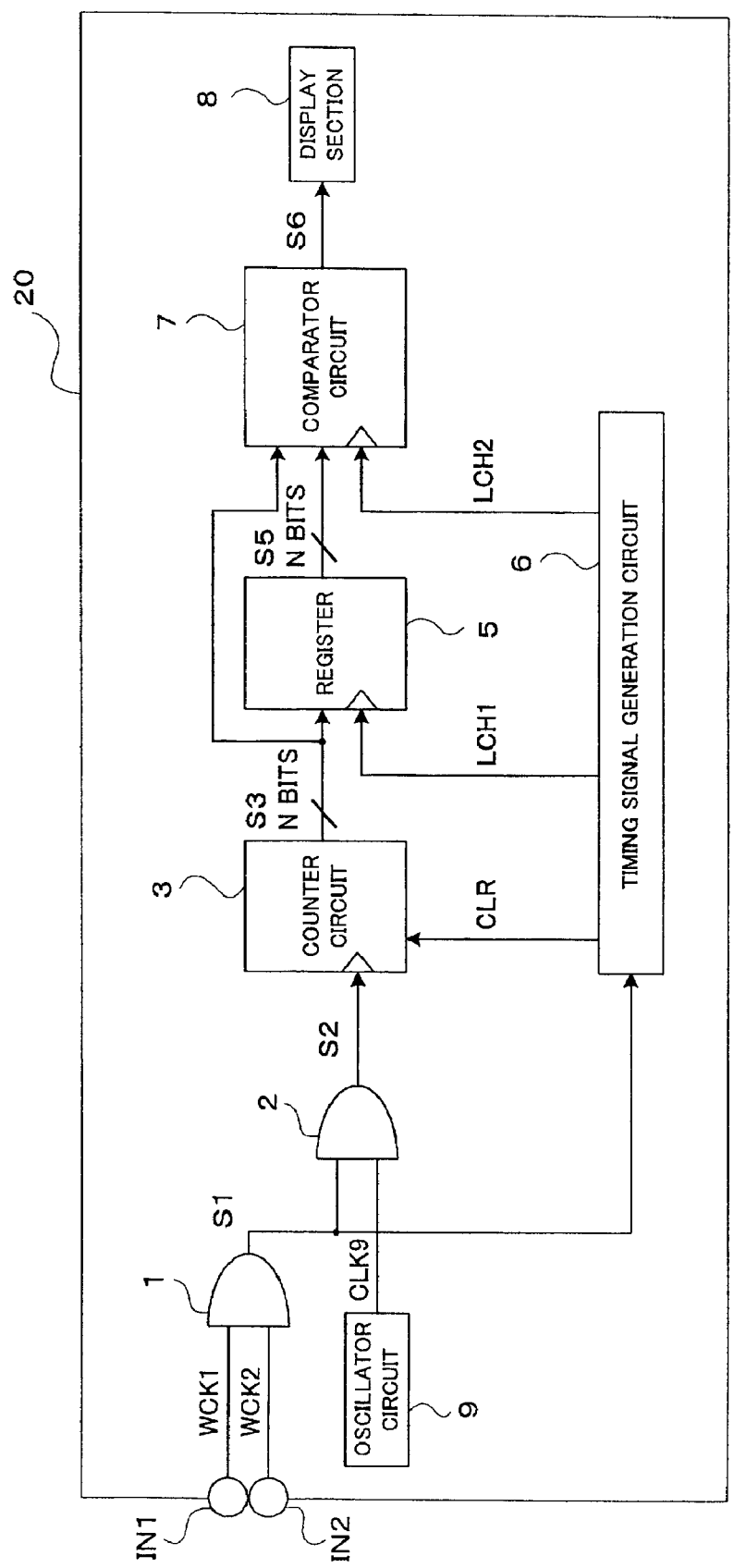
FIG. 1 is a block diagram showing an exemplary general setup of a clock-synchronism evaluating apparatus in accordance with an embodiment of the present invention.

The measurement section and determination section may be implemented by hardware including a counter circuit 3 and a comparator circuit 7 as shown in FIG. 1. However, the invention is not so limited, and the measurement section and determination section may also be implemented by software for execution by a computer or processor which is programmed to perform functions similar to those of the measurement section and determination section, i.e. which describes a sequence of procedures including a measurement step and determination step.

Now, a fuller description will be made about the embodiment of the present invention, with reference to the drawings.

Figure 2:
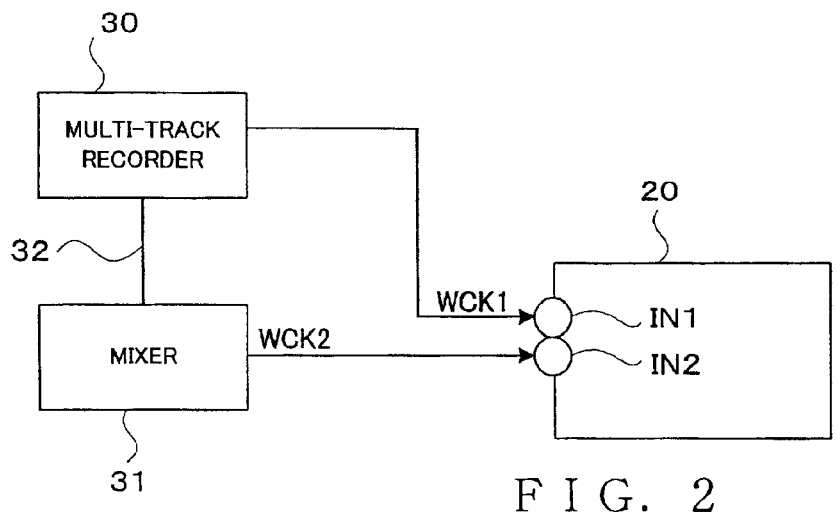
FIG. 2 is a block diagram showing an exemplary style of use of the clock-synchronism evaluating apparatus.

A. Setup of Embodiment:

FIG. 1 is a block diagram showing a general setup of a clock-synchronism evaluating apparatus 20 in accordance with an embodiment of the present invention. FIG. 2 is a diagram showing a style of use of the clock-synchronism evaluating apparatus 20, where a multi-track recorder 30 and a mixer 31 are interconnected via an interface 32. Two operating clock signals (i.e., two clock pulse trains) WC1 and WCK2 of these digital devices are fed to input terminals IN1 and IN2, respectively, of the clock-synchronism evaluating apparatus 20.

The clock-synchronism evaluating apparatus 20 of the present invention monitors the respective operating clock signals of the multi-track recorder 30 and mixer 31, and when the operating clock signals have gotten out of synchronism with each other, it promptly displays the out-of-synchronism state.

As shown in FIG. 1, the clock-synchronism evaluating apparatus 20 of the invention includes the input terminals IN1 and IN2, two AND circuits 1 and 2, the above-mentioned counter circuit 3, a register 5, a timing signal generation circuit 6, the above-mentioned comparator circuit 7, a display section 8, and an oscillator circuit 9.

The AND circuit 1 is a two-input AND circuit, into which the two operating clock signals (i.e., first and second clock pulse trains) WC1 and WCK2 to be tested for synchronism are fed via the input terminals IN1 and IN2. In turn, the AND circuit 1 outputs a clock-synchronism evaluating signal (namely, measuring gate pulses) S1 that rises in synchronism with one of the two clock signals WC1 or WCK2 and falls in synchronism with the other clock signal WC2 or WCK1.

To the AND circuit 2 are fed the clock-synchronism evaluating signal S1, and high-frequency clock signal CLK9 from the oscillator circuit 9. In turn, the AND circuit 2 selects the high-frequency clock pulses CLK9 output from the oscillator circuit 9 during each high-level period (effective period from the rise to fall of a pulse) of the clock-synchronism evaluating signal S1 and outputs the selected high-frequency clock pulses, as a to-be-counted signal S2, to the counter circuit 3.

The counter circuit 3 counts the number of the high-frequency clock pulses CLK9 having passed through the AND circuit 2 and outputs the counted result or value. That is, the counter circuit 3 measures a pulse width of the clock-synchronism evaluating signal (namely, measuring gate pulse) S1, to thereby measure a time difference between the clock signals WCK1 and WCK2 at the rise or fall time point thereof. The counter circuit 3 resets the counted result to "0" whenever a clearing signal CLR is fed thereto. Note that the counter circuit 3 selectively outputs only upper N bits of the actual counted result, for a reason to be later describe.

N-bit signal can be input in parallel to the register 5, and the register 5 has a function of outputting the input signal as it is when a latch signal LCH1 is fed thereto. The register 5 retains contents of the output signal S5 until a next latch signal LCH1 is fed thereto, and outputs the contents in response to that next latch signal LCH1.

Two N-bit signals can be input to the comparator circuit 7, and when a separate latch signal LCH2 is fed, the comparator circuit 7 functions to calculate a difference between the two input signals at that time point and outputs the calculated result S6. The comparator circuit 7 retains the calculated result S6 until a next latch signal LCH2 is fed, and outputs the calculated result S6 in response to that next latch signal LCH2.

The timing signal generation circuit 6 has a function of generating and outputting the above-mentioned clearing signal CLR and two latch signals LCH1 and LCH2. More specifically, the timing signal generation circuit 6 generates and outputs these clearing signal CLR and latch signals LCH1 and LCH2 at respective predetermined timing measured from the rise of the clock-synchronism evaluating signal S1. Details of the timing will be described later.

The display section 8 is provided for displaying the calculated difference between the two input signals, and a synchronism evaluation result is displayed via an LED display device or the like in this section 8.

B. Operation of the Embodiment:

The following paragraphs describe in greater detail the operation of the embodiment when the clock-synchronism evaluating apparatus 20 is used to evaluation synchronism between the two operating clock signals.

Prior to initiation of the synchronism evaluation, the individual components of the clock-synchronism evaluating apparatus 20 are reset in response to turning-on of the power to (i.e., powering-up of) the clock-synchronism evaluating apparatus 20; for example, the count of the counter circuit 3 is reset to "0". Then, once the operating clock signals WCK1 and WCK2 to be tested for synchronism are fed to the input terminals IN1 and IN2, the clock-synchronism evaluating apparatus 20 starts performing the synchronism evaluation on the two operating clock signals WCK1 and WCK2.

FIG. 3 is a time chart showing timing relationship among the two operating clock signals WCK1 and WCK2 applied to the clock-synchronism evaluating apparatus 20 and the output signals S1 and S2 from the AND circuits 1 and 2. As shown, the AND circuit 1 generates and outputs the clock-synchronism evaluating signal S1 that rises in synchronism with a pulse rise point of the operating clock signal WCK2 and falls in synchronism with a pulse fall point of the operating clock signal WCK1. The AND circuit 2 allows the high-frequency clock pulses CLK9 to pass therethrough only during high-level periods (H1, H2, . . .) of the clock-synchronism evaluating signal S1. The high-frequency clock pulses CLK9 having passed through the AND circuit 2 are supplied to the counter circuit 3, which counts the number of the supplied high-frequency clock pulses CLK9.

Figure 4:
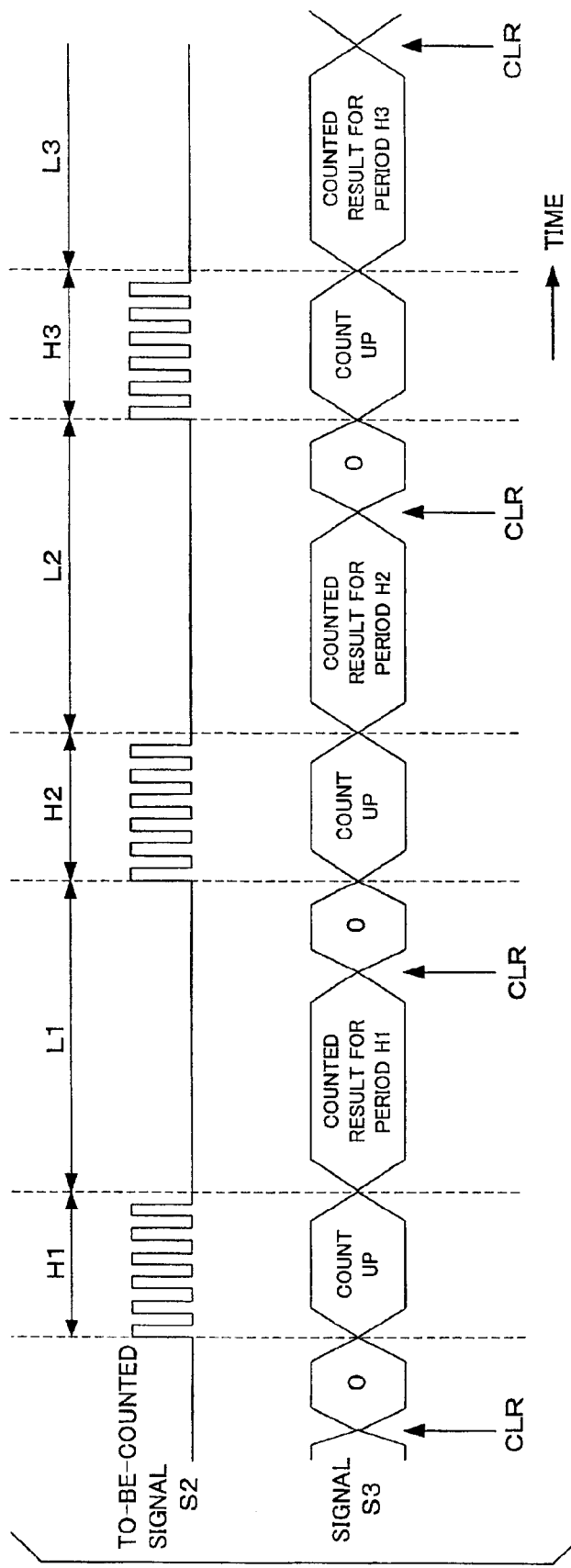
FIG. 4 is a time chart explanatory of operation of a counter circuit employed in the clock-synchronism evaluating apparatus.

FIG. 4 is a time chart explanatory of operation of the counter circuit 3. As shown, the counter circuit counts the number of the high-frequency clock pulses CLK9 supplied during each of the high-level periods H1, H2, of the clock-synchronism evaluating signal S1, and then outputs the counted result during a corresponding one of low-level periods L1, L2, . . . between the high-level periods. Clearing signal CLR is applied to the counter circuit 3 to clear the counted value to "0" obtained in the immediately preceding high-level period. The counter circuit 3 counts the number of the high-frequency clock pulses CLK9 present in the high-level periods H1, H2, . . . of the clock-synchronism evaluating signal S1 and clears the counted value to "0" in response to each clearing signal CLR applied thereto. The counter circuit 3 selectively outputs only upper N bits of the actual counted result for the reason to be stated below in relation to FIG. 5.

Figure 5:
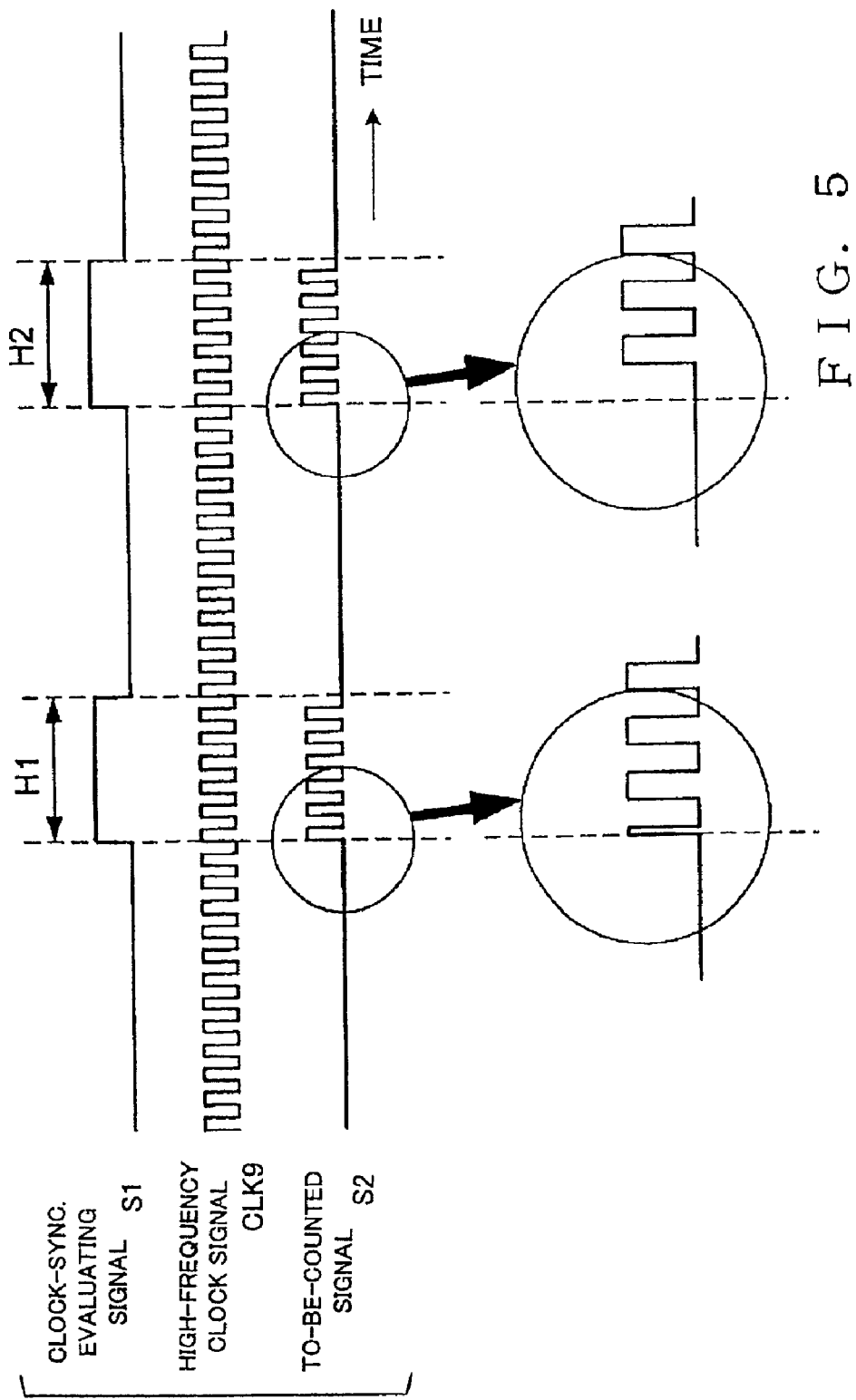
FIG. 5 is a time chart explanatory of the operation of the counter circuit in the clock-synchronism evaluating apparatus.

FIG. 5 shows, on an enlarged scale, the to-be-counted signal S2 comprising the high-frequency clock pulses CLK9 having been selectively allowed to pass through the AND circuit 2 during the individual high-level periods of the clock-synchronism evaluating signal S1. As seen in FIG. 5, the high-frequency clock pulse CLK9 tend to vary in shape at the rise (fall) point of each of the individual high-level periods, and thus the counted results of the counter circuit 3 would contain errors. To eliminate such errors in the counted results, the counter circuit 3 outputs only upper N bits as the counted results.

Figure 6:
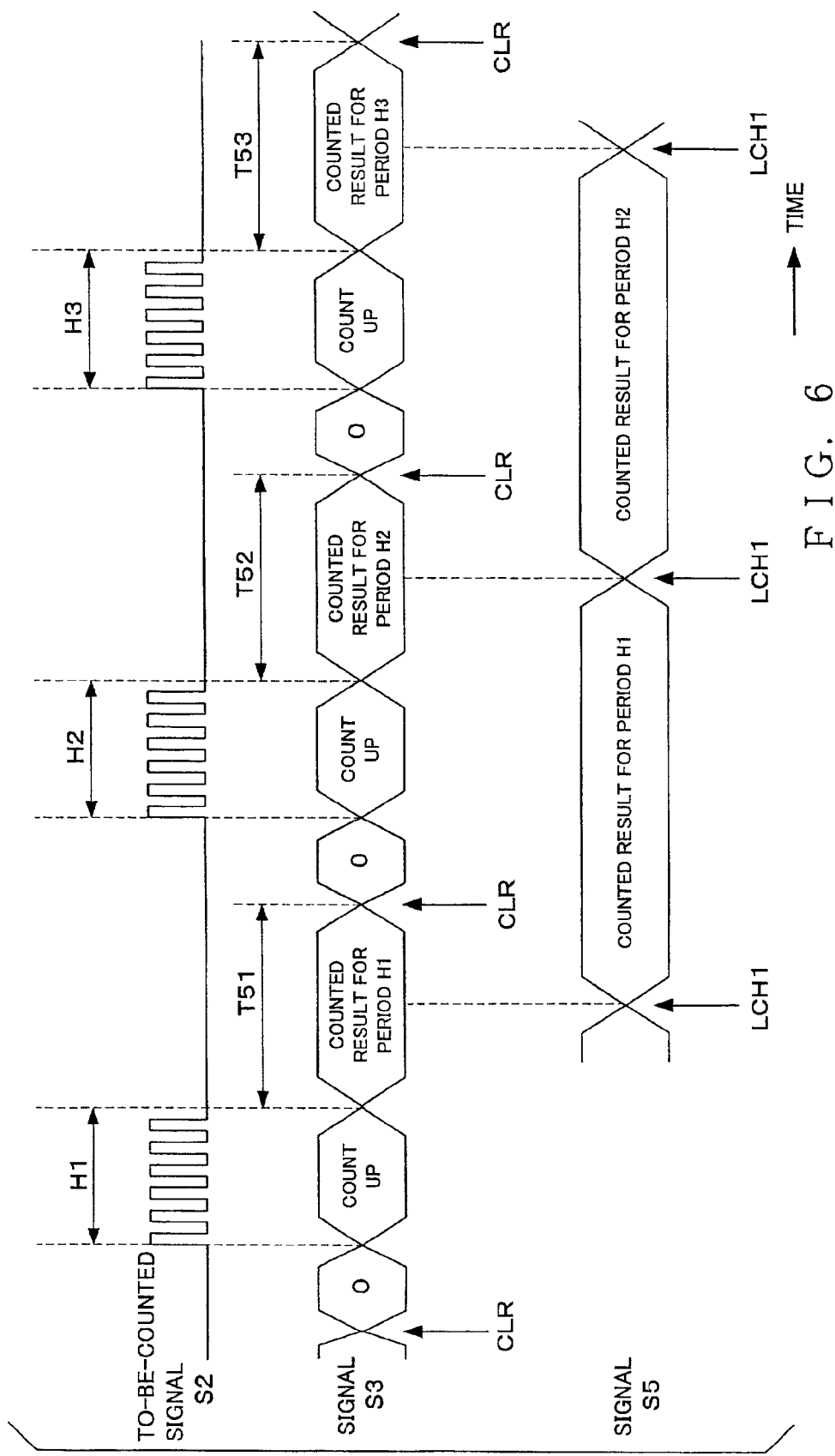
FIG. 6 is a time chart explanatory of operation of a register circuit employed in the clock-synchronism evaluating apparatus.
Figure 7:
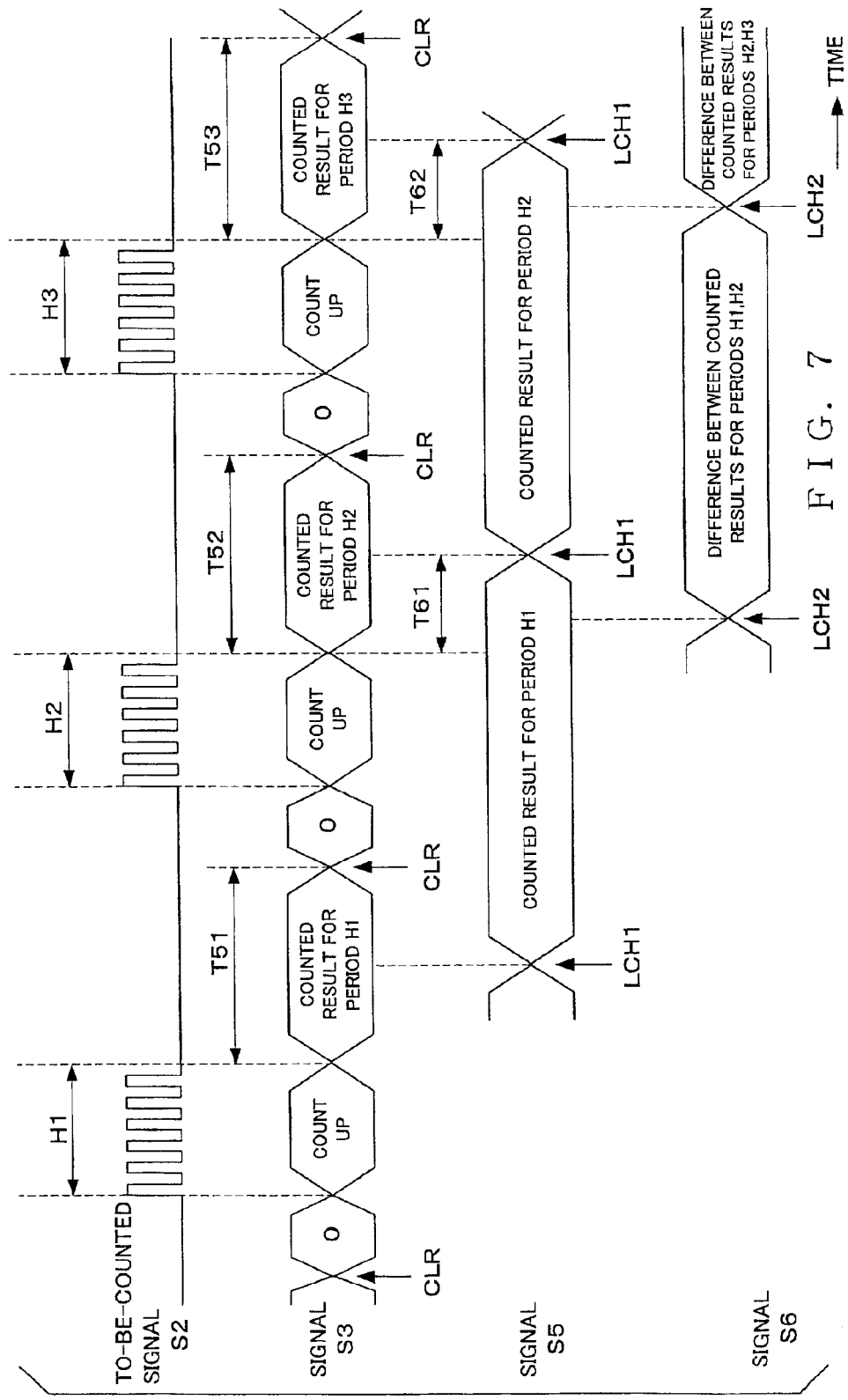
FIG. 7 is a time chart explanatory of operation of a comparator circuit employed in the clock-synchronism evaluating apparatus.

FIG. 6 is a time chart explanatory of operation of the register circuit 5. As seen in this figure, the counter circuit 3 outputs the counted value of the high-frequency clock pulse CLK9, having passed through the AND circuit 2 during each of the high-level periods (H1, H2, . . . ) of the clock-synchronism evaluating signal S1 (i.e., the counted value of the high-frequency clock pulse CLK9 present within each of the high-level periods), for a predetermined time period (T51, T52, . . . ) following the high-level period. Latch signal LCH1 is given to the register circuit 5 at a time point within each of the predetermined time periods. Thus, in response to the latch signal LCH1, the register circuit 5 sequentially outputs the counted results of the high-frequency clock pulse CLK9 present within the individual high-level periods (H1, H2, FIG. 7 is a time chart showing, in addition to the contents of FIG. 6, an output signal S6 from the comparator circuit 7. As shown, the counted results of the high-frequency clock pulse CLK9 present within the individual high-level periods (H1, H2, . . . ) are output from the counter circuit 3 and register circuit 5 for predetermined time periods. Further, in respective partial periods (T61, T62, . . . ) of the individual high-level periods, the counted results of the high-frequency clock pulse CLK9 present within pairs of adjacent high-level periods (H1 and H2, H2 and H3, . . . ) are output from the counter circuit 3 and register circuit 5.

At a time point within each of the partial periods (T61, T62, . . . ), the latch signal LCH2 is given to the comparator circuit 7. Thus, in response to the latch signal LCH2, the comparator circuit 7 sequentially outputs differences between the counted results of the high-frequency clock pulse CLK9 present within the pairs of adjacent high-level periods (H1 and H2, H2 and H3, . . . ). Such comparison results output from the comparator circuit 7 are delivered to and visually displayed by the display section 8.

Note that a pair of the high-level periods to be compared by the comparator circuit 7 need not necessarily be those adjacent to each other. For example, there may be provided a plurality of the register circuits 5 to which the latch signal LCH1 is supplied, so that the comparator circuit 7 compares one high-level period and another high-level period detected a predetermined time after detection of the one high-level period. In an alternative, the register circuit 5 may be replaced with a RAM, and the timing signal generation circuit 6 may control timing of data writing/reading to/from the RAM and adjust a time interval between the high-level periods to be compared by the comparator circuit 7. Such control can effectively minimize influences of jitters or other fluctuations in the clock pulses.

More details of the instant embodiment will be given below.

Figure 8:
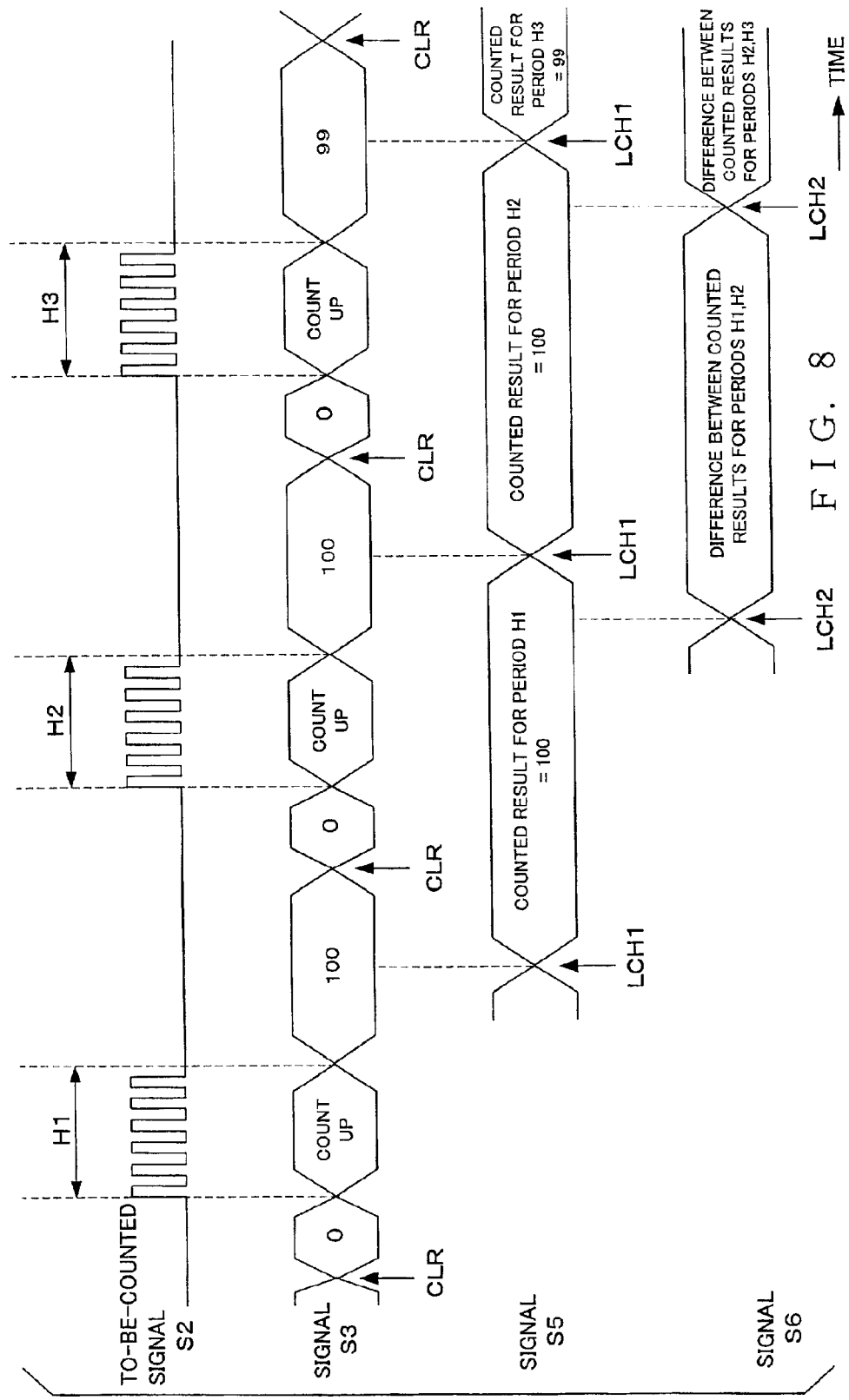
FIG. 8 is a time chart explanatory of operation of various components of the clock-synchronism evaluating apparatus.

FIG. 8 is a time chart explanatory of signal flows in various portions of the clock-synchronism evaluating apparatus 20 when the frequencies of the supplied operating clocks WCK1 and WCK2 slightly differ from each other. In this case, the high-level periods (H1, H2, . . . ) of the clock-synchronism evaluating signal S1 progressively become shorter or longer. Therefore, the numbers of the high-frequency clock pulses present within the periods H1, H2, . . . of the to-be-counted signal S also progressively vary in accordance with the lengths of these high-level periods.

FIG. 8 shows an example where the high-frequency clock pulses present within the periods H1, H2 and H3 are counted as "100", "100" and "99", respectively, as a result of which the comparator circuit 7 outputs, as a difference in counted results for the periods H2 and H3, a value other than "0". At a time point when the difference in counted results is thus output from the comparator circuit 7, the display section 8 shows that there is currently a frequency difference between the two operating clock signals WCK1 and WCK2.

The following paragraphs describe time T required to detect the frequency difference between the operating clock signals WCK1 and WCK2. In the instant embodiment, the time T required to detect the frequency difference corresponds to an amount of time that elapses before a difference in time length between adjacent high-level periods (H1, H2, H3, . . . ) becomes capable of being evidently measured as a difference corresponding to one of the pulses of the high-frequency clock signal CLK9. The time T required to detect the frequency difference can be determined by the following equation:

$$1/T = Fclk \times (FW1 - FW2)/FW2$$

where "T" represents time (sec.) required to detect the frequency difference, "FW1" represents the frequency (Hz) of the operating clock signal WCK1, "FW2" represents the frequency (Hz) of the operating clock signal WCK2, and "Fclk" represents the frequency (Hz) of the high-frequency clock pulses CLK9 output from the oscillator circuit 9.

Let's now consider a more specific case where the frequencies of the operating clock signals WCK1 and WCK2 are 48,000 Hz (=48 kHz) and 48,001 Hz, respectively, and the frequency (Hz) of the high-frequency clock pulses CLK9 output from the oscillator circuit 9 is 12.288 MHZ (=48 kHz×256). In this case, the time T can be determined as "3.9 msec." by the equation above.

In practice, one or more lower bits of the counted value output from the counter circuit 3 are ignored in view of an error in the counted value. For example, if lower two bits are ignored, then the minimum resolution of the count data, to be actually used as time length measurement data of the high-level periods (H1, H2, H3, . . . ), of the output signal of the counter circuit 3 is equal to four cycles of the measuring clock signal CLK9, so that the time required for the frequency difference detection in this case is four times as long as the above-mentioned time T. Even in such a case, only 15.6 msec. (3.9 msec.×4) is necessary to detect the frequency difference.

C. Advantageous Results of the Embodiment:

With the above-described arrangements, the clock-synchronism evaluating apparatus 20 in accordance with the embodiment of the present invention can promptly evaluate synchronism between two input clock signals, i.e. whether or not the two input clock signals are in synchronism with each other.

D. Modification:

It should be appreciated that the above-described embodiment of the present invention is just for illustrative purposes and various modifications of the same are possible without departing the basic principles of the invention as will be set out below.

Modification 1:

The manner of generating the clock-synchronism evaluating signal S1 may be modified as desired. Namely, whereas the clock-synchronism evaluating signal S1 has been described as generated via the AND circuit 1, the AND circuit 1 may be replaced with a NAND, OR circuit or the like.

Namely, any other signal can be used as the clock-synchronism evaluating signal S1 as long as the other signal rises in synchronism with one of the two operating clock signals to be tested for synchronism and falls in synchronism with the other operating clock signal, and such a signal can afford the same advantageous results as the clock-synchronism evaluating signal S1.

Modification 2:

Whereas the above-described embodiment is designed to perform the synchronism evaluation by measuring the length of the rise-to-fall, high-level period of the clock-synchronism evaluating signal S1 using a count of the high-frequency clock pulses CLK9, the synchronism evaluation may be performed by measuring the length of the fall-to-rise, low-level period of the clock-synchronism evaluating signal S1. In such a case too, there can be obtained the same advantageous results as the above-described embodiment.

Modification 3:

Further, as the above-mentioned high-frequency clock signal CLK9, there may be used, for example, an internal system clock signal (24.576 MHZ), CPU clock signal or the like of the IEEE1394. Namely, any desired clock signal can be used as the high-frequency clock signal CLK9 in the present invention, as long as the desired clock signal has a frequency sufficiently higher than the frequencies of the two operating clock signals to be compared.

Modification 4:

FIG. 9 is a time chart showing an example of the clock-synchronism evaluating signal S1 in a case where the two operating clock signals WCK1 and WCK2 are phase-shifted from each other by about 180°. In this case, the clock-synchronism evaluating signal S1 presents very short (or almost no) high-level periods, and thus there may be provided a delay circuit in relation to any one of the input terminal IN1 and IN2 with a view to making appropriate phase adjustment. In an alternative, there may be provided a circuit for changing the duty factors of the clocks.

Figure 10:
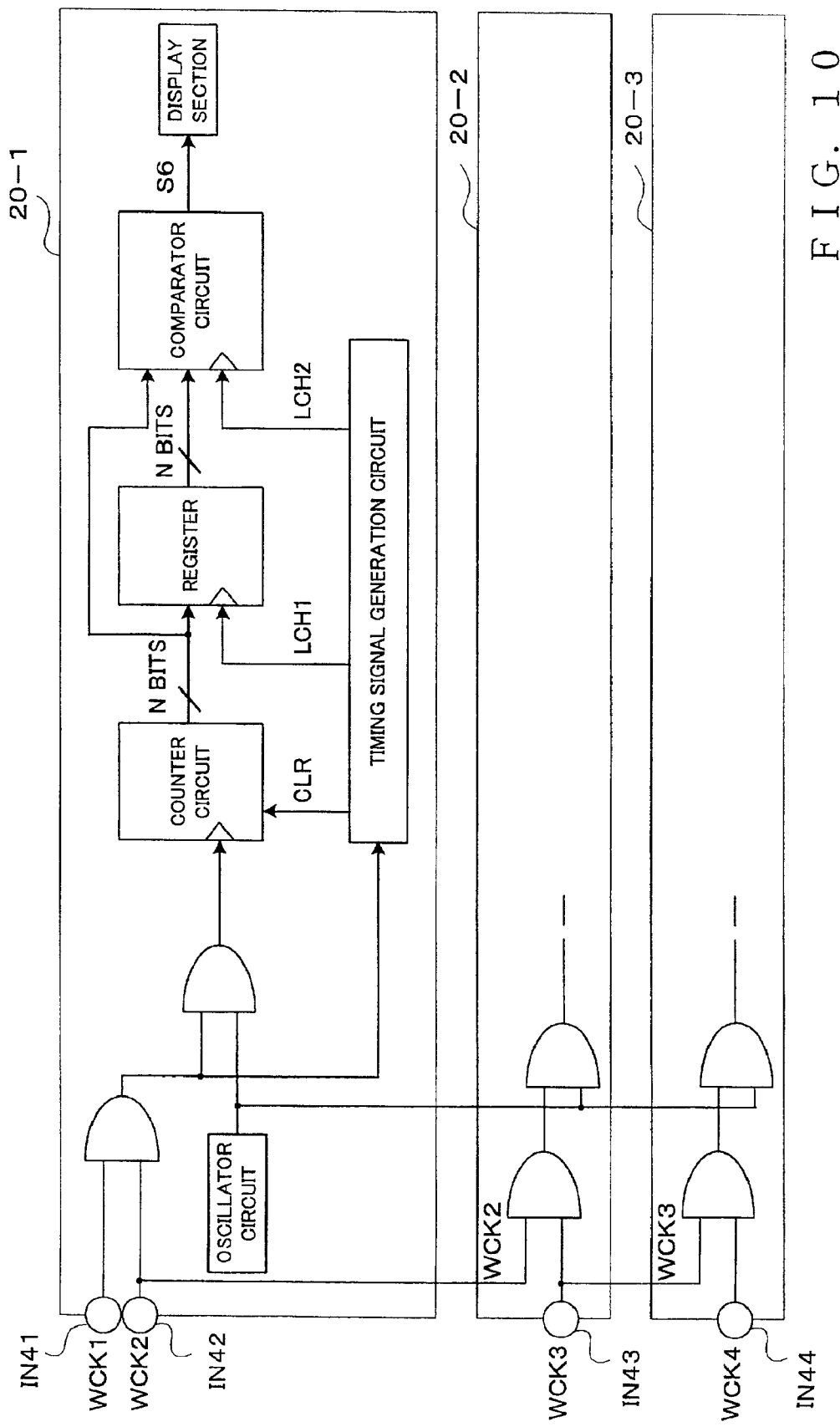
FIG. 10 is a block diagram explanatory of a modified clock-synchronism evaluating apparatus in accordance with the present invention.
Figure 13:
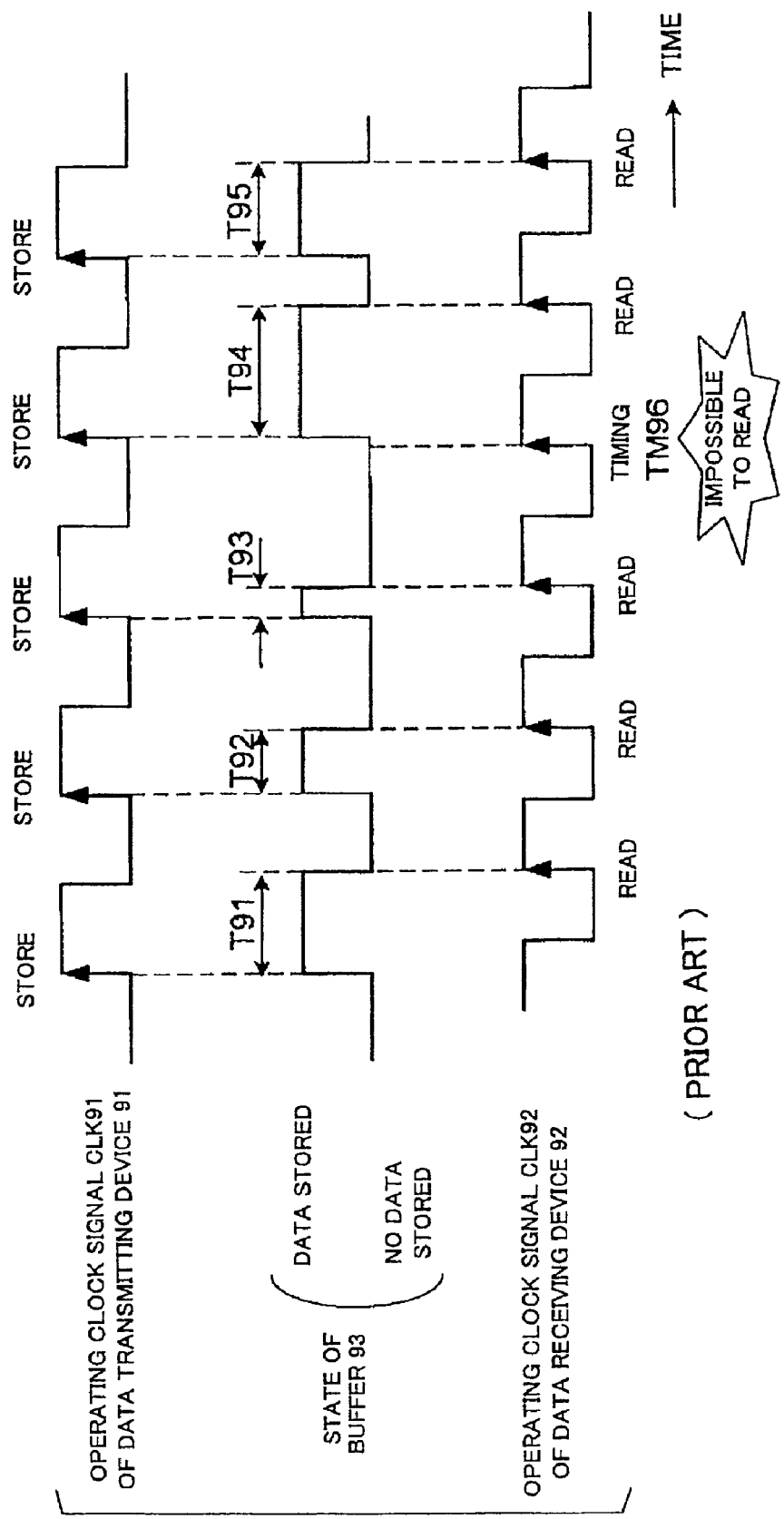
FIG. 13 is a time chart explanatory of the conventionally-known clock-synchronism evaluating method.

Modification 5:

The present invention may be used to perform the synchronism evaluation on respective operating clock signals of three or more audio devices. FIG. 10 is a block diagram showing an exemplary setup of a modified clock-synchronism evaluating apparatus which includes four input terminals IN41–IN44. With such a setup, the modified clock-synchronism evaluating apparatus can perform the synchronism evaluation on respective operating clock signals of four audio devices.

Namely, in FIG. 10, there are provided three clock-synchronism evaluating apparatus 20-1, 20-2 and 20-3 which are each similar in construction to the clock-synchronism evaluating apparatus 20 of FIG. 1. The first clock-synchronism evaluating apparatus 20-1 evaluates synchronism between clock signals WCK1 and WCK2, the second clock-synchronism evaluating apparatus 20-2 evaluates synchronism between clock signals WCK2 and WCK3, and the third clock-synchronism evaluating apparatus 20-3 evaluates synchronism between clock signals WCK3 and WCK4. If it has been determined that all of the three clock-synchronism evaluating apparatus 20-1, 20-2 and 20-3 are in synchronism with one another, this means that all of the four clock signals WCK1-WCK4 have a same frequency. Note that increasing the number of the clock-synchronism evaluating apparatus can perform the synchronism evaluation on a greater number of clock signals (clock pulse trains) in a manner similar to the above-described.

Figure 11:
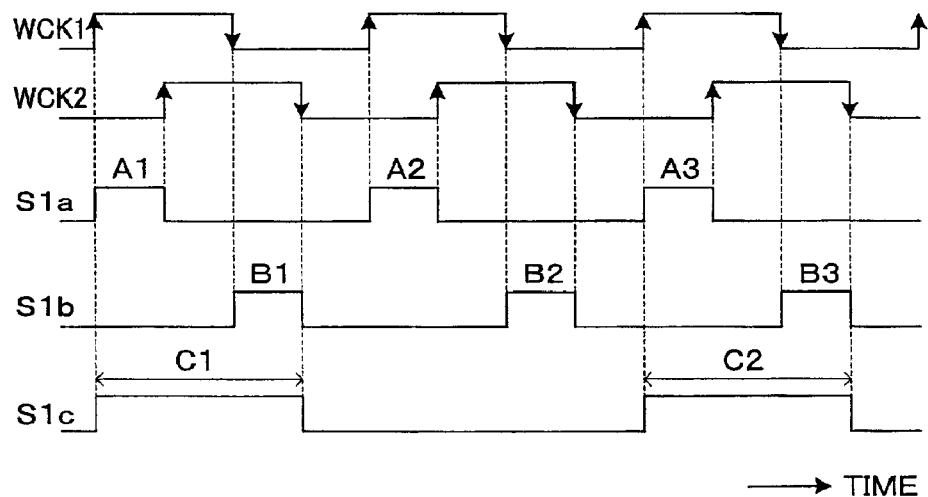
FIG. 11 is a time chart explanatory of another modification of the present invention.

Modification 6:

Whereas the clock-synchronism evaluating signal (namely, measuring gate pulses) S1 has been described above as being generated in correspondence with each time difference (H1, H2, H3, . . . ) from the pulse rise (or fall) point of the second clock signal WCK2 to the pulse fall (or rise) point of the first clock signal WCK2, the present invention is not so limited. For example, a clock-synchronism evaluating signal (namely, measuring gate pulses) S1a may be generated in correspondence with each time difference (A1, A2, A3, . . . ) between the pulse rise (or fall) point of the first clock signal WCK1 and the pulse rise (or fall) point of the second clock signal WCK2, as shown at "S1a" in FIG. 11. In an alternative, a clock-synchronism evaluating signal (namely, measuring gate pulses) S1b may be generated in correspondence with each time difference (B1, B2, B3, . . . ) between the pulse fall (or rise) point of the first clock signal WCK1 and the pulse fall (or rise) point of the second clock signal WCK2, as shown at "S1b" in FIG. 11. In another alternative, a clock-synchronism evaluating signal (namely, measuring gate pulses) S1c may be generated in correspondence with each time difference (C1, C2, . . . ) between the pulse fall (or rise) point of the first clock signal WCK1 and the pulse fall (or rise) point of the second clock signal WCK2, as shown at "S1c" in FIG. 11. In short, it is only necessary to measure a time difference between a predetermined phase point of the first clock signal WCK1 and a predetermined phase point of the second clock signal WCK2.

In each of the above-described embodiment and modifications, the difference may be measured every few clock cycles, rather than every clock cycle, of the first and second clock signals WCK1 and WCK2 and then used for the synchronism evaluation. For example, in the case of FIG. 3, the count (i.e., measurement) may be made for the period H1 and period H3 (or subsequent period), with the measurement for the period H2 omitted, so as to compare the counted values for the period H1 and period H3 (or subsequent period).

Modification 7:

Behavior of the clock-synchronism evaluating apparatus 20 may be controlled by software. For example, the timing signal generation circuit 6 may be replaced with a ROM and CPU (computer), in which case programs necessary for operating the clock-synchronism evaluating apparatus 20 are prestored in the ROM. In this case, operation of the various components of the clock-synchronism evaluating apparatus 20 can be controlled by the CPU running the prestored programs.

Here, the programs may be installed in any desired manner. For example, the programs may be installed in the clock-synchronism evaluating apparatus 20 by way of a storage medium, such as a semiconductor memory or CD-ROM (Compact Disk-Read Only Memory), or using a so-called network-based delivery scheme in which the programs are supplied from a predetermined server computer to a portable information device, such as a wrist-watch-type information device, via the Internet or other form of communication network.

In summary, the present invention arranged in the above-described manner can promptly perform the evaluate synchronism between a plurality of input clock signal frequencies.

What is claimed is:

1. A clock-synchronism evaluating apparatus comprising:
   a measurement section that measures a difference between a predetermined phase point of a first clock signal and a predetermined phase point of a second clock signal, wherein said measurement section generates a measuring gate pulse that rises in synchronism with one of said first and second clock signals and falls in synchronism with other of said first and second clock signals, said measurement section measuring a pulse width of the generated measuring gate pulse by counting clock pulses higher in frequency than said first and second clock signals; and
   a determination section that determines whether or not frequencies of said first clock signal and said second clock signal are the same, on the basis of a variation over time of the difference measured by said measurement section, wherein said determination section determines that the frequencies of said first clock signal and said second clock signal are, the same when counted values indicative of respective pulse widths of an adjacent pair of the measuring gate pulses generated in succession coincide with each other, but determines that the frequencies of said first clock signal and said second clock signal are not the same when the counted values of the adjacent pair of the measuring gate pulses do not coincide with each other.

2. The clock-synchronism evaluating apparatus of claim 1, wherein said measurement section measures the difference every cycle of said first and second clock signals.

3. The clock-synchronism evaluating apparatus of claim 1, wherein said measurement section measures the difference every few cycles of said first and second clock signals.

4. The clock-synchronism evaluating apparatus of claim 1, wherein the predetermined phase point of said first clock signal is either one of pulse rise and fall points in said first clock signal, and the predetermined phase point of said second clock signal is either one of pulse rise and fall points in said second clock signal.

5. A clock-synchronism evaluating apparatus of claim 1, wherein said measurement section counts the difference between the predetermined phase point of said first clock signal and the predetermined phase point of said second clock signal, by counting clock pulses higher in frequency than said first and second clock signals.

6. A clock-synchronism evaluating method comprising:
   measuring a difference between a predetermined phase point of a first clock signal and a predetermined phase point of a second clock signal, wherein a measurement section generates a measuring gate pulse that rises in synchronism with one of said first and second clock signals and falls in synchronism with other of said first and second clock signals, said measurement section measuring a pulse width of the generated measuring gate pulse by counting clock pulses higher in frequency than said first and second clock signals; and
   determining whether or not frequencies of said first clock signal and said second clock signal are the same, on the basis of a variation over time of the difference measured by said measurement section, wherein a determination section determines that the frequencies of said first clock signal and said second clock signal are the same when counted values indicative of respective pulse widths of an adjacent pair of the measuring gate pulses generated in succession coincide with each other, but determines that the frequencies of said first clock signal and said second clock signal are not the same when the counted values of the adjacent pair of the measuring gate pulses do not coincide with each other.

7. The clock-synchronism evaluating method of claim 6, wherein said measurement section measures the difference every cycle of said first and second clock signals.

8. The clock-synchronism evaluating method of claim 6, wherein said measurement section measures the difference every few cycles of said first and second clock signals.

9. The clock-synchronism evaluating method of claim 6, wherein the predetermined phase point of said first clock signal is either one of pulse rise and fall points in said first clock signal, and the predetermined phase point of said second clock signal is either one of pulse rise and fall points in said second clock signal.

10. The clock-synchronism evaluating apparatus of claim 6, wherein said measurement section counts the difference between the predetermined phase point of said first clock signal and the predetermined phase point of said second clock signal, by counting clock pulses higher in frequency than said first and second clock signals.

11. A machine-readable storage medium containing a group of instructions to cause a machine to perform a method for evaluating synchronism between clock signals, said method comprising:
   measuring a difference between a predetermined phase point of a first clock signal and a predetermined phase point of a second clock signal, wherein a measurement section generates a measuring gate pulse that rises in synchronism with one of said first and second clock signals and falls in synchronism with other of said first and second clock signals, said measurement section measuring a pulse width of the generated measuring gate pulse by counting clock pulses higher in frequency than said first and second clock signals; and
   determining whether or not frequencies of said first clock signal and said second clock signal are the same, on the basis of a variation over time of the difference measured by said measurement section, wherein a determination section determines that the frequencies of said first clock signal and said second clock signal are the same when counted values indicative of respective pulse widths of an adjacent pair of the measuring gate pulses generated in succession coincide with each other, but determines that the frequencies of said first clock signal and said second clock signal are not the same when the counted values of the adjacent pair of the measuring gate pulses do not coincide with each other.

12. The machine-readable storage medium of claim 11, wherein said measurement section measures the difference every cycle of said first and second clock signals.

13. The machine-readable storage medium of claim 11, wherein said measurement section measures the difference every few cycles of said first and second clock signals.

14. The machine-readable storage medium of claim 11, wherein the predetermined phase point of said first clock signal is either one of pulse rise and fall points in said first clock signal, and the predetermined phase point of said second clock signal is either one of pulse rise and fall points in said second clock signal.

15. The machine-readable storage medium of claim 4, wherein said measurement section counts the difference between the predetermined phase point of said first clock signal and the predetermined phase point of said second clock signal, by counting clock pulses higher in frequency than said first and second clock signals.

* * * * *